(12) United States Patent
Jaranson et al.

(10) Patent No.: US 10,059,239 B2
(45) Date of Patent: Aug. 28, 2018

(54) AIR BLADDER WITH STACKED CELL SYSTEM

(71) Applicant: Ford Global Technologies, LLC, Dearborn, MI (US)

(72) Inventors: John Wayne Jaranson, Dearborn, MI (US); Tejaswi Nandam, Ann Arbor, MI (US); Jeroen Lem, Maastricht (NL); Grant A. Compton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/270,149

(22) Filed: Sep. 20, 2016

(65) Prior Publication Data

US 2018/0079335 A1    Mar. 22, 2018

(51) Int. Cl.
| | | |
|---|---|---|
| *A47C 3/00* | (2006.01) | |
| *A47C 7/14* | (2006.01) | |
| *A47C 7/46* | (2006.01) | |
| *B60N 2/90* | (2018.01) | |
| *B60N 2/06* | (2006.01) | |
| *B60N 2/44* | (2006.01) | |

(52) U.S. Cl.
CPC ............. *B60N 2/914* (2018.02); *B60N 2/06* (2013.01); *B60N 2/4415* (2013.01)

(58) Field of Classification Search
CPC .. A47C 4/54; A47C 7/467; A47C 7/46; A47C 7/345; B60N 2/4415; B60N 2/06; B60N 2/66; B60N 2/62

USPC ........................................ 297/284.1–284.11
See application file for complete search history.

(56) References Cited

U.S. PATENT DOCUMENTS

| | | | | |
|---|---|---|---|---|
| 4,059,909 | A | * | 11/1977 | Kron ...................... A47C 7/467 |
| | | | | 297/180.12 |
| 4,629,253 | A | | 12/1986 | Williams |
| 4,759,543 | A | * | 7/1988 | Feldman ............ A63B 23/0233 |
| | | | | 297/284.6 |
| 4,965,899 | A | * | 10/1990 | Sekido .................... B60N 2/665 |
| | | | | 297/284.11 |
| 5,082,326 | A | * | 1/1992 | Sekido ................. B60N 2/4415 |
| | | | | 297/284.6 |
| 5,135,282 | A | * | 8/1992 | Pappers ............... B60N 2/4415 |
| | | | | 297/284.3 |
| 5,433,506 | A | | 7/1995 | Jensen |

(Continued)

*Primary Examiner* — Mark R Wendell
(74) *Attorney, Agent, or Firm* — Vichit Chea; Price Heneveld LLP (57) ABSTRACT

A seat includes a seat portion with an air bladder having an outer casing. Multiple fluidly interconnected cells are disposed within a cavity of the outer casing and are configured to inflate the outer casing from a deflated condition to an inflated condition. The cells may be arranged within the air bladder so as to provide a directional inflation of the air bladder from a first portion of the air bladder towards a second portion. First and second support substrates may be disposed within the seat portion, wherein the air bladder is positioned between the first and second substrates. The air bladder may be configured to inflate and displace the first and second substrates relative to one another from an at-rest position to an actuated position. A biasing mechanism may be coupled to at least one of the first and second substrates for biasing the substrates towards the at-rest position.

9 Claims, 12 Drawing Sheets

(56) References Cited

U.S. PATENT DOCUMENTS

| | | | |
|---|---|---|---|
| 5,772,281 A | 6/1998 | Massara | |
| 6,129,419 A | 10/2000 | Neale | |
| 6,203,105 B1* | 3/2001 | Rhodes, Jr. | A47C 4/54 297/284.1 |
| 6,206,474 B1* | 3/2001 | Kruse | B60N 2/70 297/284.3 |
| 9,211,824 B2 | 12/2015 | Arant et al. | |
| 2004/0124679 A1* | 7/2004 | Teppo | A47C 7/462 297/284.4 |
| 2004/0222684 A1* | 11/2004 | VanSickle | A47C 4/54 297/452.41 |
| 2010/0289302 A1* | 11/2010 | Cheng | B60N 2/002 297/180.12 |
| 2013/0285426 A1* | 10/2013 | Arant | B60N 2/62 297/284.1 |
| 2014/0167465 A1 | 6/2014 | Sakata et al. | |

\* cited by examiner

AIR BLADDER WITH STACKED CELL SYSTEM

FIELD OF THE INVENTION

The present invention generally relates to a vehicle seat having one or more air bladders disposed therein. Particularly, the present invention relates to a vehicle seat having air bladders that are comprised of a plurality of interconnected cells for providing a more controlled and customized contour for the air bladder.

BACKGROUND OF THE INVENTION

It is generally known to equip vehicle seats with various support functions for providing a more customized comfort setting for a vehicle occupant. Air bladders may be used in a number of locations within a vehicle seat to provide adjustability to the vehicle occupant. When used in seating structures, air bladders can exhibit undesirable compliance when not fully inflated. This undesirable compliance, or springiness/bounciness, is generally due to the nonlinear relationship between displacement and pressure found in an occupied vehicle seat. Thus, the present invention generally seeks to provide a system of air bladders that can provide the desired displacement while reducing or eliminating undesired compliance.

SUMMARY OF THE INVENTION

One aspect of the present invention includes a seat having a seat portion with an air bladder disposed within the seat portion. The air bladder includes an outer casing having an interior cavity and an outer contour defined by an outer surface thereof. A plurality of cells is disposed within the cavity of the outer casing. The cells are inflatable cells used to inflate the outer casing from a deflated condition to an inflated condition. Interconnections are disposed between the cells to fluidly interconnect the cells.

Another aspect of the present invention includes a seat having a seat portion with first and second support substrates disposed therein. An air bladder is positioned between the first and second support substrates and includes a plurality of interconnected cells configured to inflate the air bladder for displacing at least one of the first and second support substrates from an at-rest position to an actuated position. A biasing mechanism is coupled to at least one support substrate and configured to bias the first and second substrates towards the at-rest position.

Yet, another aspect of the present invention includes a seat having a seat portion with one or more air bladders disposed therein. The one or more air bladders include a plurality of cells. The cells are arranged within each air bladder to provide a directional inflation of the air bladders from a first portion of the air bladder towards a second portion of the air bladder. One or more directional pressure valves interconnect the cells within each air bladder.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
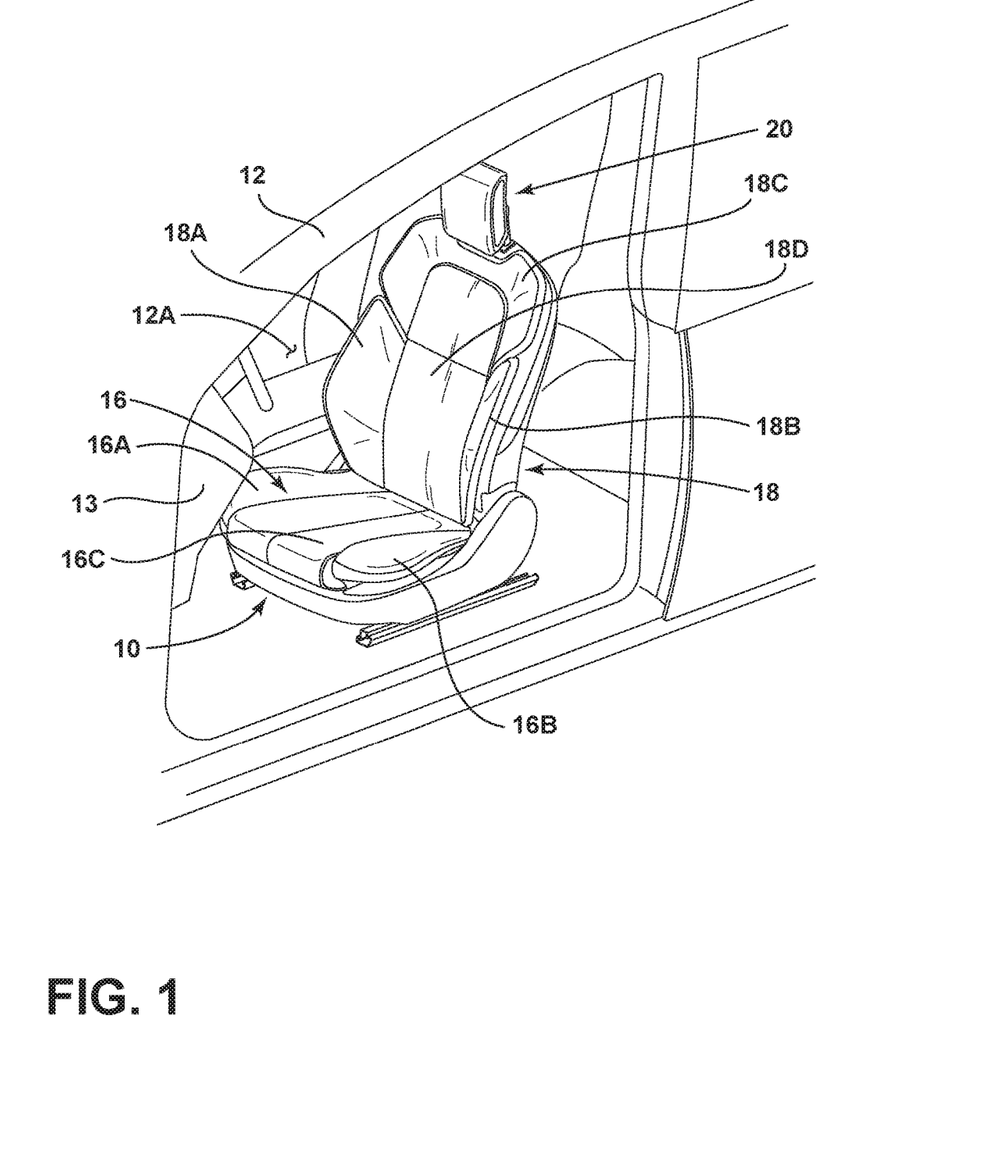
FIG. 1 is a top perspective view of a vehicle seat disposed within an interior of a vehicle.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle seat 10 is shown disposed in a vehicle 12 within an interior 12A of the vehicle 12. The vehicle seat 10 is disposed in the vehicle interior 12A adjacent to an instrument panel or dashboard 13. In FIG. 1, the vehicle seat 10 is specifically disposed in the vehicle interior 12A on a driver's side seating area. However, it is contemplated that the vehicle seat 10 can be disposed in other areas of a vehicle interior, such as the passenger side seating area, a rear seating area, or a third row seating area. The vehicle seat 10 generally includes a substantially horizontal seat portion 16 and a seatback 18 having a headrest assembly 20 disposed on an upper portion of the seatback 18. It is contemplated that the seatback 18 is a pivoting member configured for pivotal movement relative to the seat portion 16. The seat portion 16 generally includes a central support portion 16C having protruding fins or side supports 16A, 16B disposed on opposite sides thereof. The side supports 16A, 16B are generally disposed at an inward angle directed towards the central support portion 16C which is generally angled in a car rearward direction. The side supports 16A, 16B are configured to provide support for a vehicle occupant as seated in the vehicle seat 10 when the vehicle 12 is in motion. Similarly, the seatback 18 includes side supports 18A, 18B and an upper collar portion 18C. The side supports 18A, 18B and the upper collar portion 18C are generally angled towards a central support portion 18D of the seatback 18. The various parts of the seat portion 16 and seatback 18 are contemplated to include air bladders disposed within an interior thereof as further described below with particular reference to FIG. 2.

Figure 2:
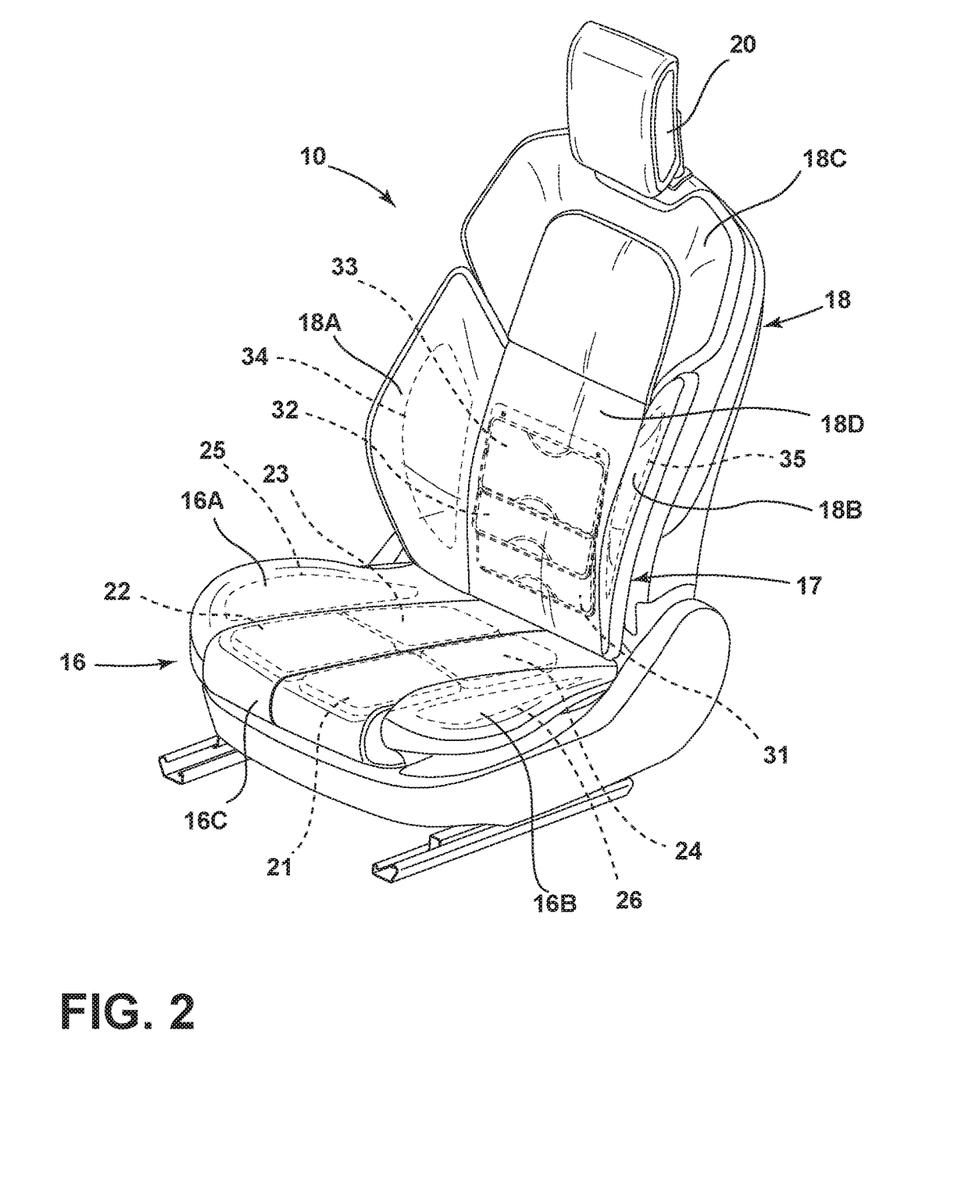
FIG. 2 is a top perspective view of the vehicle seat of FIG. 1 removed from the vehicle interior and having a plurality of air bladders disposed therein.

Referring now to FIG. 2, the vehicle seat 10 is shown having a cover 17 that is contemplated to be comprised of a suitable natural or synthetic material, or any combination thereof, that is used to generally cover or upholster the vehicle seat 10. As shown in FIG. 2, the vehicle seat 10 includes a series of air bladders 21-24 disposed in the central support portion 16C of the seat portion 16. Further, a plurality of air bladders 31-33 are disposed in the central support portion 18D of the seatback 18. Further, air bladders 25, 26 are shown disposed in the side supports 16A, 16B of the seat portion 16. Air bladders 34, 35 are shown disposed in the side supports 18A, 18B of the seatback 18. The air bladders 21-26, 31-35 are configured to inflate with air to a desired level in response to an input by a vehicle occupant. In this way, the air bladders 21-26, 31-35 are configured to selectively inflate or deflate relative to a specific comfort setting selected by a vehicle occupant in order to provide a customized support setting for the vehicle seat 10. The arrangement of the air bladders 21-26, 31-35 found in the embodiment of the vehicle seat 10 shown in FIG. 2 is exemplary only, and any arrangement of air bladders within the vehicle seat is contemplated for use with the present invention.

Figure 3A:
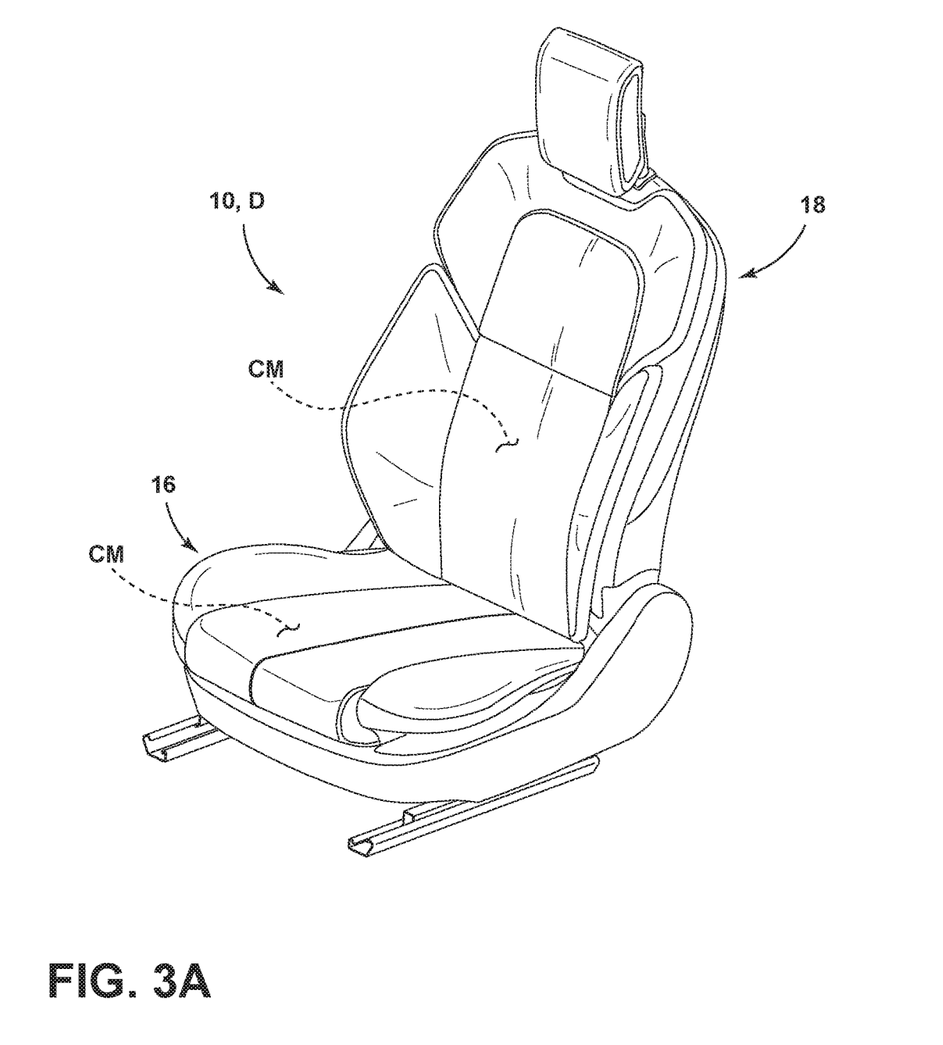
FIG. 3A is a top perspective view of the vehicle seat of FIG. 2 shown in a deflated condition.

Referring now to FIG. 3A, the vehicle seat 10 is shown in a deflated condition D, wherein it is contemplated that the air bladders have been fully deflated, such that support for the vehicle occupant is generally provided by cushion materials CM disposed within both the seat portion 16 and the seatback 18. Generally, in assembly, the air bladders 21-26, 31-35 (FIG. 2) are supported on the cushion material CM of the seat portion 16 and the seatback 18.

Figure 3B:
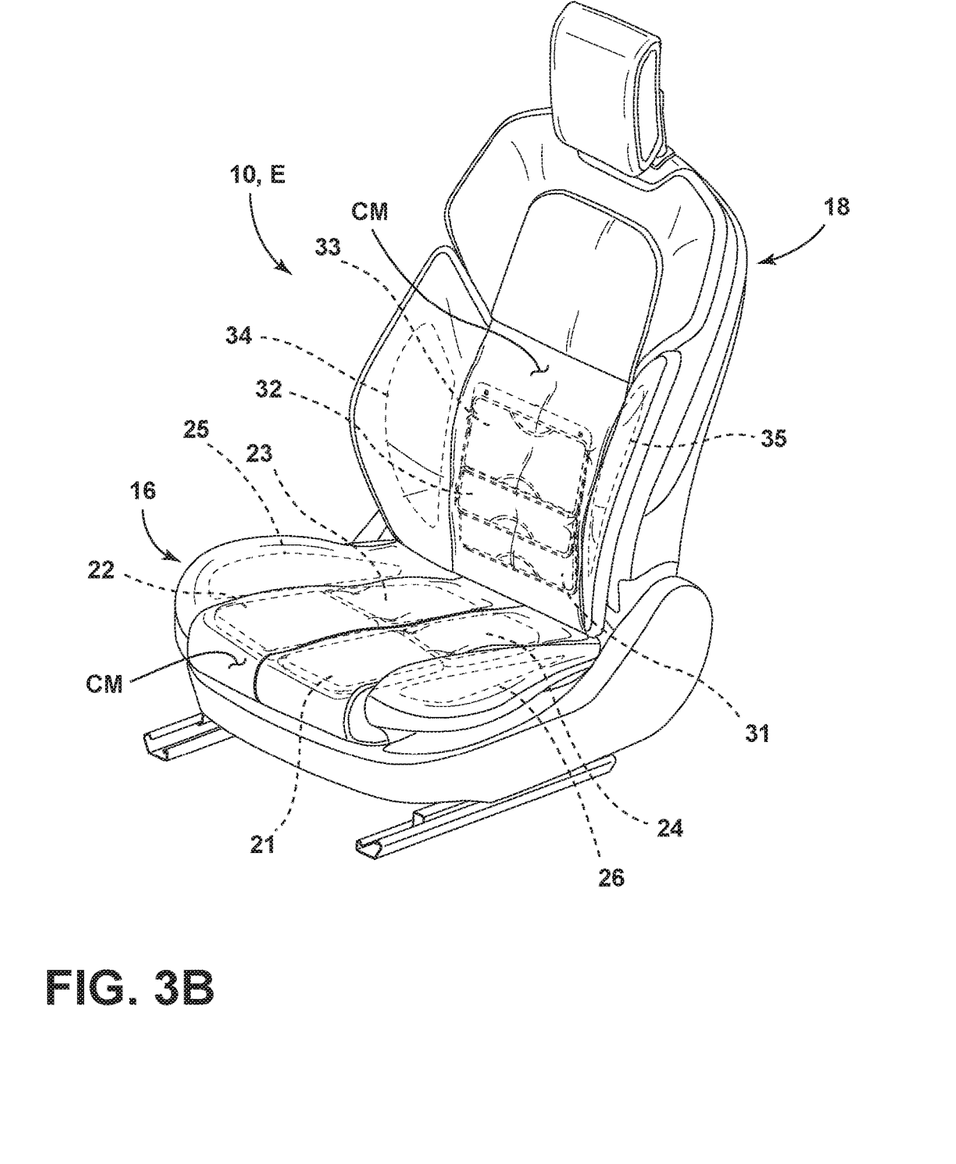
FIG. 3B is a top perspective view of the vehicle seat of FIG. 3A shown in an inflated condition.

Referring now to FIG. 3B, the vehicle seat 10 is shown in an inflated condition I, wherein the air bladders 21-26, 31-35 have been inflated to provide added support along portions of the seatback 18 and seat portion 16 as desired by the vehicle occupant. It is contemplated by the present invention that any one of the air bladders 21-26, 31-35 can be selectively inflated or deflated independently to provide customized support for a vehicle occupant. Further, the configuration of the air bladders 21-26, 31-35 shown in FIG. 2 is exemplary only, and the air bladders of the present invention are configured for use in any configuration within a vehicle seat, as will be understood by one of ordinary skill.

Figure 4:
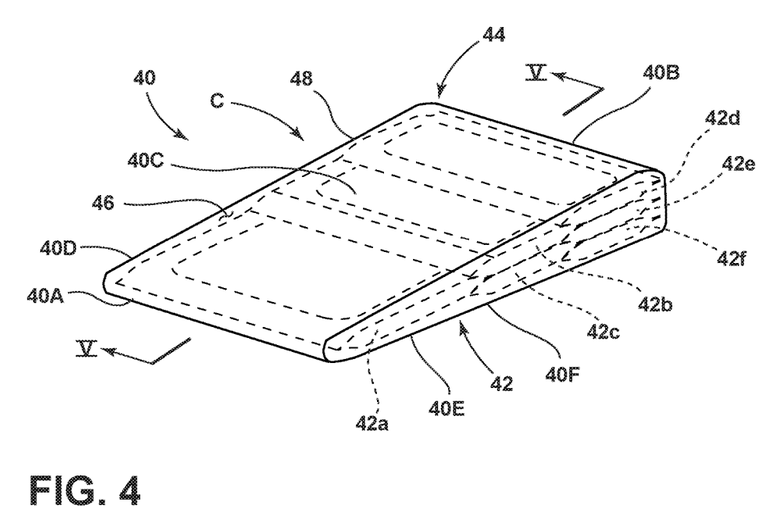
FIG. 4 is a top perspective view of an air bladder having a plurality of cells disposed therein shown in phantom.

Referring now to FIG. 4, an air bladder 40 according to one embodiment of the present concept is shown, wherein the air bladder 40 includes a plurality of cells 42 disposed therein. Specifically, the air bladder 40 includes an outer casing 44 that surrounds an interior cavity 46 in which the plurality of cells 42 are enclosed in a stacked configuration to give the air bladder 40 a specific outer contour C defined by an outer surface 48 of the outer casing 44. In the embodiment shown in FIG. 4, the plurality of cells 42 includes individual cells 42a-42f that are shown in an inflated condition to provide the selected outer contour C for the air bladder 40. Specifically, the air bladder 40 of FIG. 4 includes a front portion 40A, a rear portion 40B and side portions 40D, 40E disposed around a central portion 40C. In FIG. 4, the central portion 40C has a general slope from the rear portion 40B towards the front portion 40A as provided by the configuration of cells 42a-42f disposed within the air bladder 40. In the specific embodiment of FIG. 4, the rear portion 40B includes three stacked air bladders 42d-42f to provide a larger profile relative to a middle portion 40F having two stacked cells 42b, 42c. Further, the front portion 40A includes a single cell 42a having a smaller profile as compared to the profile of the middle portion 40F. In this way, the overall contour C of the air bladder 40 is a sloped contour from the rear portion 40B towards the front portion 40A. It will be understood that the configuration of cells 42a-42f within the air bladder 40 shown in the embodiment of FIG. 4 is exemplary only and any configuration of cells is contemplated for use with the present invention for providing an overall contour C desired for the air bladder 40 for use within a vehicle seat.

Figure 5:
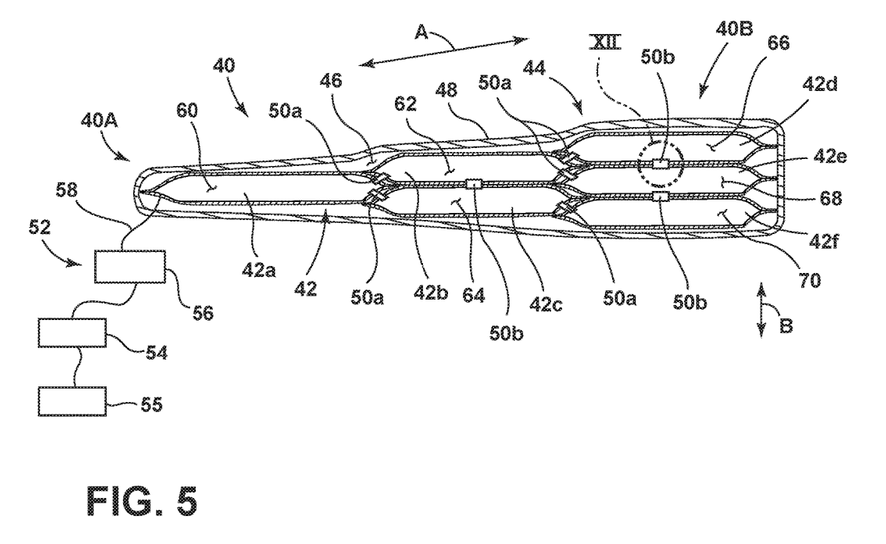
FIG. 5 is a cross-sectional view of the air bladder of FIG. 4 taken at line V.

Referring now to FIG. 5, a cross-sectional view of the air bladder 40 of FIG. 4 is shown wherein the cells 42a-42f of the plurality of cells 42 disposed within the interior cavity 46 of the air bladder 40 are shown as interconnected cells, such that free exchange of air is provided from one cell to another. Specifically, a number of valves define interconnections 50a, 50b between the cells 42a-42f for controlling air movement from one cell to another. The valves are contemplated to be directional pressure valves which open and close under specific pressure conditions as further described below.

With further reference to FIG. 5, the interconnections 50a, 50b are shown providing pathways between adjacent cells of the plurality of cells 42. Specifically, the interconnections 50a provide lateral or outward interconnections between adjacent cells in a direction as indicated by arrow A. Interconnections 50b provide vertical interconnections between adjacent cells which are disposed in a stacked configuration within the interior cavity 46 of the air bladder 40, thereby providing air movement in a substantially vertical direction as indicated by arrow B. In this way, the air bladder 40 is configured to provide directional inflation and deflation from one cell to another. Specifically, the air bladder 40 shown in FIG. 5 includes an inflation system 52 for inflating the air bladder 40. The inflation system 52 includes a controller 54 which is operably coupled to a user interface 55 and a pump system 56. In use, a vehicle occupant will use the user interface 55 to input a selected inflation level which is sent to the controller 54 for initiation of an inflation sequence. The controller 54 sends an inflation or deflation signal to the pump system 56 which includes one or more supply lines 58 for inflating the cells 42a-42f of the air bladder 40. In the embodiment shown in FIG. 5, a single supply line 58 is shown connected to cell 42a for inflating an interior volume 60 of cell 42a. Once a pressure within the interior volume 60 of cell 42a reaches a threshold pressure, interconnections 50a will open to move air from the interior volume 60 of cell 42a to the interior volumes 62, 64 of cells 42b, 42c, respectively. In this way, inflation of the air bladder 40 is an outward directional inflation stemming from the front portion 40A of the air bladder 40 to the rear portion 40B of the air bladder 40 in the direction indicated by arrow A. It is further contemplated that the interconnection 50a disposed between cell 42a and cell 42c may have a decreased pressure threshold as compared to the interconnection 50a between cell 42a and cell 42b. In this way, the inflation of cells 42b, 42c would be provided in series in an upward direction as indicated by arrow B with cell 42c inflating before cell 42b given the lower pressure threshold of the interconnection 50a disposed between cells 42a, 42c. Similarly, the interior volumes 66, 68 and 70 of cells 42d, 42d, and 42f, respectively, may be configured with various pressure thresholds at the interconnections 50a between cells 42d-42f and cells 42b-42c. Interconnections 50b between cells 42d, 42e and 42f can also assist in the directional inflation of the air bladder 40 given their position on directly adjacent or shared membrane walls of the cells 42d-42f as further described below.

As used herein, the term "directional inflation" or "directional deflation" is used to describe a controlled inflation or deflation of an air bladder. With specific reference to the term "directional inflation", the present invention provides for intercellular inflation of an air bladder in a controlled manner, wherein interconnections between adjacent cells direct air flow in a single direction during an inflation procedure. The inflation of an air bladder, such as air bladder 40 shown in FIGS. 4 and 5, can occur between interconnected cells, such as cells 42a-42f shown in FIGS. 4 and 5, in a guided direction as dictated by predetermined pressure thresholds of the interconnections, such as interconnections 50a, 50b shown in FIGS. 4 and 5, disposed between adjacent cells. In this way, the directional inflation of an air bladder using the present invention is distinguished from the inflation of a standard air bladder having a single cell or interior volume which inflates in a unitary manner. The segmented or intercellular structure of the air bladders of the present invention provide for systematic and controlled inflation and deflation, as opposed to simply filling the entire interior cavity 46 of the air bladder 40 at once. Further, it is also contemplated that the air bladder 40 described above may include the stacked configuration of interconnected cells without the need for an outer casing. The cells are contemplated to be comprised of a semi-flexible polymeric material that can be coupled together using a welding technique, such as an ultrasonic or hot air welding technique, or any other coupling means to ensure that the overall contour C of the air bladder 40 is maintained. Thus, the interconnected cells themselves may also define the contours C of the air bladders 40, 80 as found in FIGS. 4 and 6 without the need for an outer casing.

Figure 6:
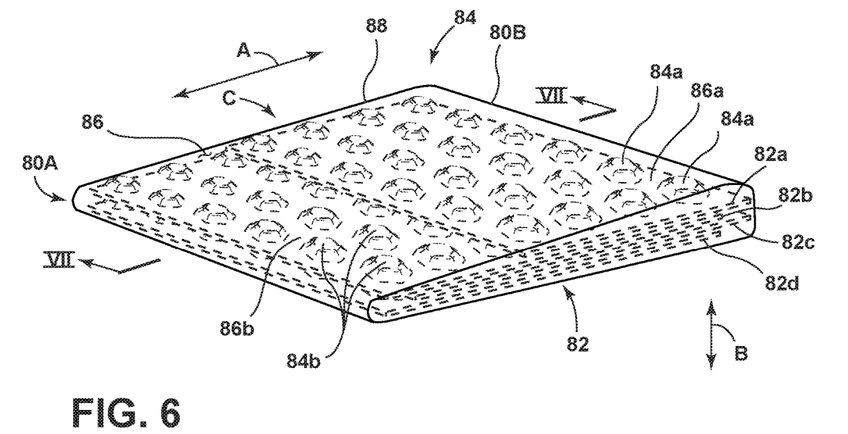
FIG. 6 is a top perspective view of an air bladder of another embodiment having a plurality of cells disposed therein as shown in phantom.
Figure 7:
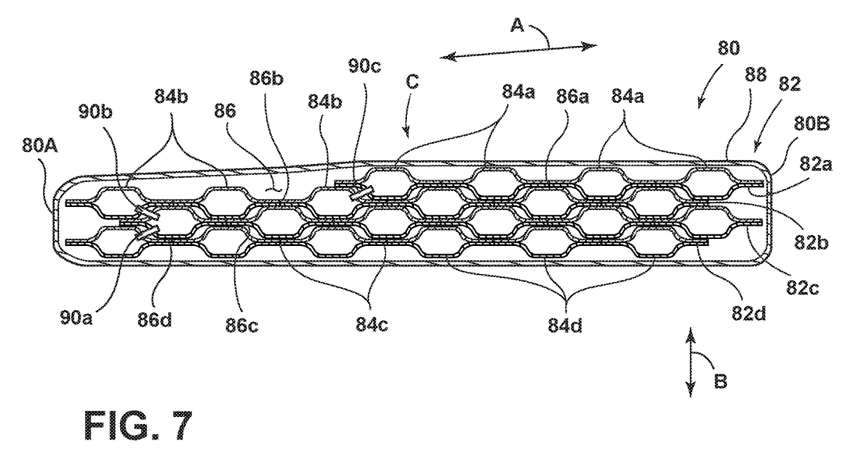
FIG. 7 is a cross-sectional view of the air bladder of FIG. 6 taken at line VII.

Referring now to FIG. 6, another embodiment of an air bladder 80 is shown having a plurality of cells 82 disposed therein. Much like air bladder 40 shown in FIGS. 4 and 5, air bladder 80 includes an outer casing 84 defining an interior cavity 86 of the air bladder 80. The outer casing 84 includes an outermost surface 88 providing a contour C for the air bladder 80 that is a wedged-shaped contour much like the contour C of the air bladder 40 shown in FIG. 4. Specifically, the contour C of air bladder 80 includes a slopped or downward angled configuration from a rear portion 80B towards a front portion 80A of the air bladder 80. The slopped contour C is due to the configuration of the plurality of cells 82 disposed within the interior cavity 86 of the air bladder 80. In the embodiment shown in FIG. 6, the plurality of cells 82 includes multiple sheets 82a-82d of polymeric material having multiple cells disposed thereon. Specifically, as shown in FIG. 6, sheet 82a includes individual cells 84a spaced along a planar body portion 86a of sheet 82a. Similarly, cells 84b of sheet 82b are shown disposed along a planar portion 86b of sheet 82b. The cells 84a, 84b shown in FIG. 6 include a specific geometry for interfitting the cells of one sheet to the cells of an adjacent sheet, as best shown in FIG. 7. In this way, the sheets 82a-82d are stacked within the interior cavity 86 of the air bladder 80 for providing directional inflation of the air bladder 80. It is contemplated that the individual cells 84a, 84b are interconnected by pathways or interconnections disposed between cells in the planar body portions 86a, 86b of the sheets 82a, 82b. Further, it is contemplated that sheets 82c and 82d also include similar planar body portions having individual interconnected cells disposed thereon. In this way, the individual cells are contemplated to inflate or deflate in series along an inflation or deflation path as indicated by arrows A and B.

Referring now to FIG. 7, a cross-sectional view of the air bladder 80 is shown, wherein the sheets 82a-82d are disposed within the interior cavity 86 of the air bladder 80 having cells 84a-84d disposed in a stacked configuration. In the configuration shown in FIG. 7, sheet 82a includes a planar body portion 86a having individual cells 84a disposed thereon and interconnected through the planar body portion 86a. Similarly, sheets 82b, 82c and 82d all include planar body portions 86b, 86c, 86d, respectively. Individual cells 84b, 84c, 84d are disposed on the respective planar body portions 86b, 86c, 86d of the sheets 82b, 82c, 82d. Much like sheet 82a, the cells of sheets 82b-82d are contemplated to be interconnected through the planar body portions 86b-86d, thereof. Further, as shown in FIG. 7, interconnections 90a, 90b, 90c are shown positioned between the individual sheets 82a-82d through the air bladder 80. Specifically, interconnection 90a is shown interconnecting sheet 82d with sheet 82c. In this way, it is contemplated that during an inflation procedure, the individual cells 84d of sheet 82d will be filled with air until an internal pressure of the specific cell having interconnection 90a disposed thereon reaches a threshold interior pressure in order to open interconnection 90a into sheet 82c. As the individual cells 84c of sheet 82c fill with air, a threshold pressure of an individual cell connected with interconnection 90b will exceed a threshold pressure of interconnection 90b to open interconnection 90b from sheet 82c into sheet 82b. Likewise, as sheet 82b fills with air, a threshold pressure of an interconnected cell will exceed the threshold pressure of interconnection 90c to open interconnection 90c from sheet 82*b* into sheet 82*a*. In this way, the air bladder 80 is provided with a directional inflation of the air bladder 80 in the directions as indicated by arrows A and B. While three interconnections 90*a*-90*c* are shown in FIG. 7, it is contemplated that any number of interconnections may be used in order to provide a specific directional inflation of the air bladder 80. The specific directional inflation of the air bladder 80 is contemplated to proceed from the front portion 80A of the air bladder 80 to the rear portion 80B of the air bladder 80 in a substantially horizontal direction as indicated by arrow A. Further, the air bladder 80 will also inflate in a vertical direction as indicated by arrow B as the plurality of stacked sheets 82 fill in the upward direction from sheet 82*d* towards sheet 82*a*.

Figure 8A:
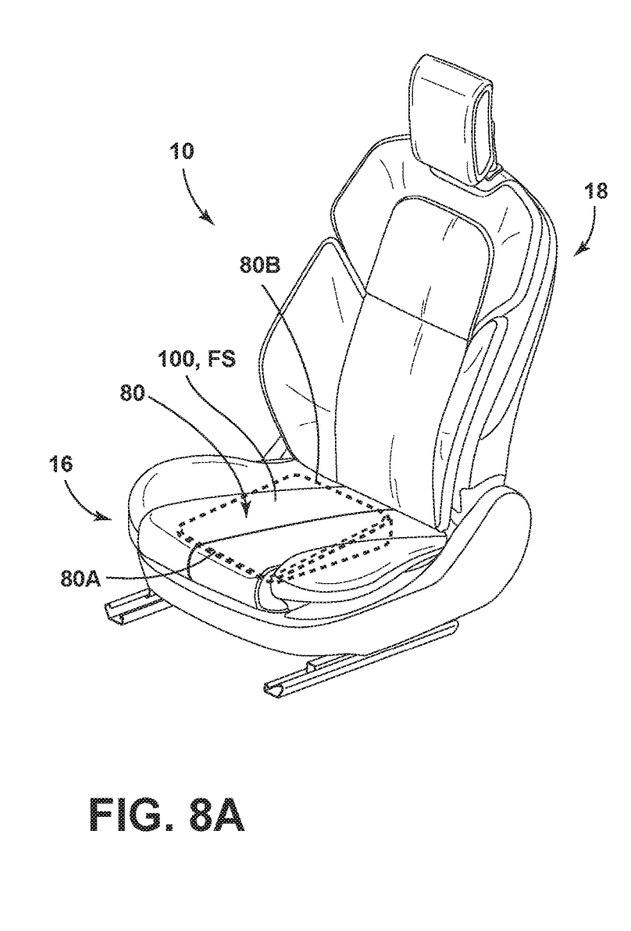
FIG. 8A is a top perspective view of a vehicle seat shown having an air bladder disposed in a seat portion thereof in a deflated condition.
Figure 8B:
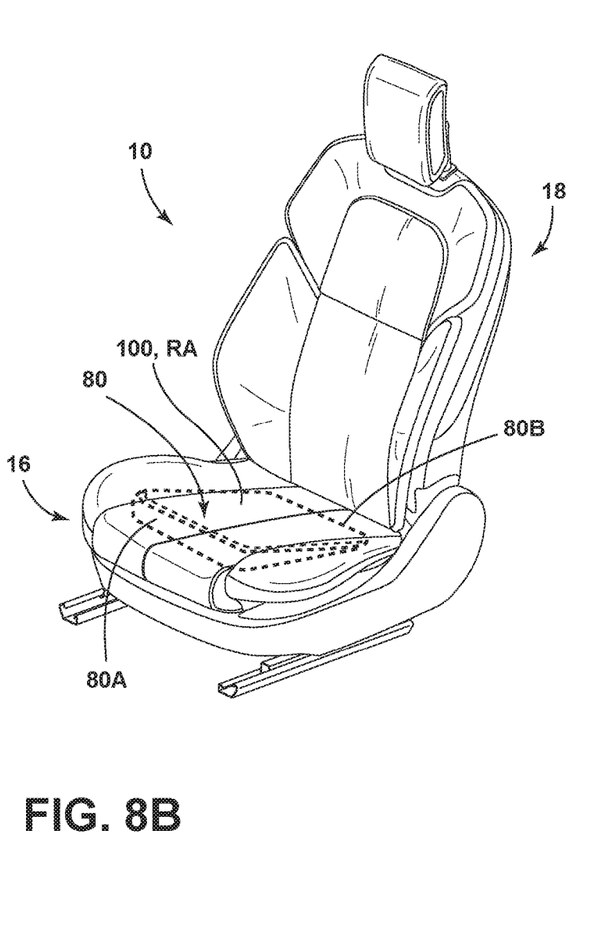
FIG. 8B is a top perspective view of the vehicle seat of FIG. 8A showing the air bladder disposed in the seat portion thereof in an inflated condition.

Referring now to FIGS. 8A and 8B, the vehicle seat 10 is shown having air bladder 80 disposed in a seat portion 16 thereof. It is further contemplated that the embodiment of an air bladder 40 shown in FIGS. 4 and 5 may also be used as the air bladder shown in FIGS. 8A and 8B. The orientation of the air bladder 80 in the seat portion 16 of FIGS. 8A and 8B is provided to show different angular positions that the air bladder 80 can adjust to in a controlled and directional inflation manner as described above. With specific reference to FIG. 8A, the air bladder 80 is shown having an upper support surface 100 thereof disposed in a forward angled position FA from the rear portion 80B towards the front portion 80A of the air bladder 80.

With specific reference to FIG. 8B, the air bladder 80 is shown having the upper support surface 100 thereof disposed in a rearward angled position RA from the front portion 80A towards the rear portion 80B of the air bladder 80.

Figure 9A:
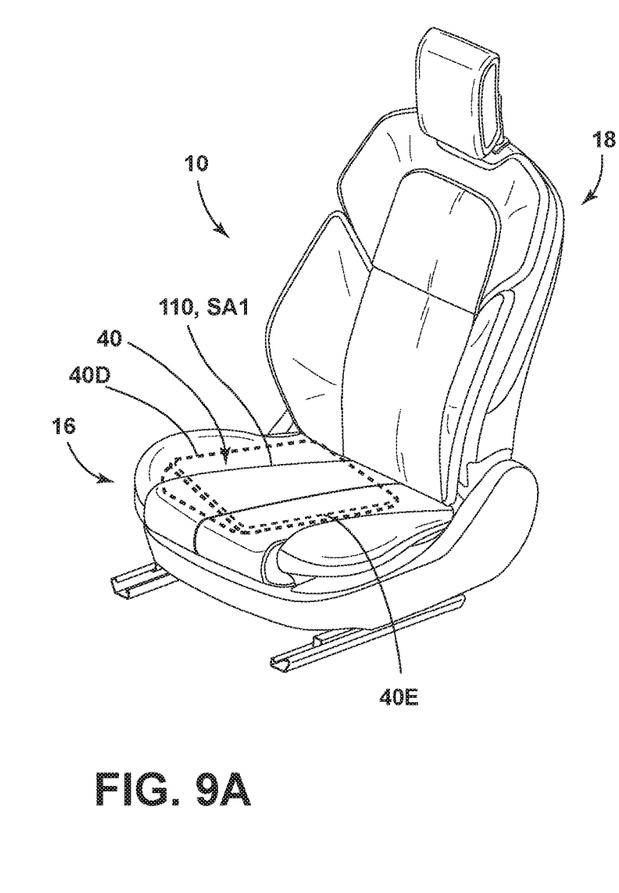
FIG. 9A is a top perspective view of a vehicle seat showing an air bladder in a first inflated condition.

Referring now to FIG. 9A, the air bladder 40 is shown having an upper support surface 110 thereof disposed in a first angled position SA1 from the side portion 40D towards the side portion 40E of the air bladder 40.

Figure 9B:
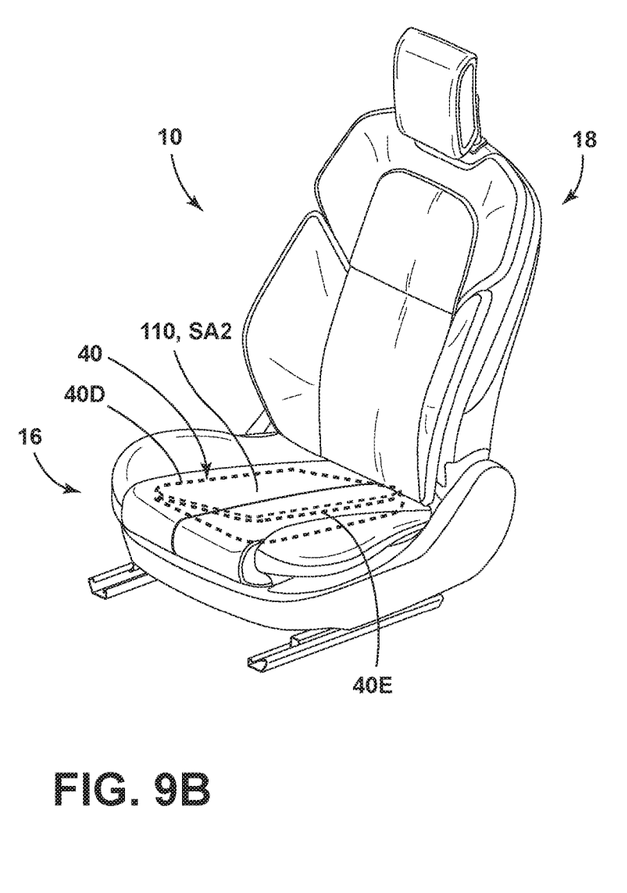
FIG. 9B is a top perspective view of the vehicle seat of FIG. 9A showing the air bladder in a second inflated position.

Referring now to FIG. 9B, the air bladder 40 is shown having the upper support surface 110 thereof disposed in a second angled position SA2 from the side portion 40E towards the side portion 40D of the air bladder 40.

Figure 10A:
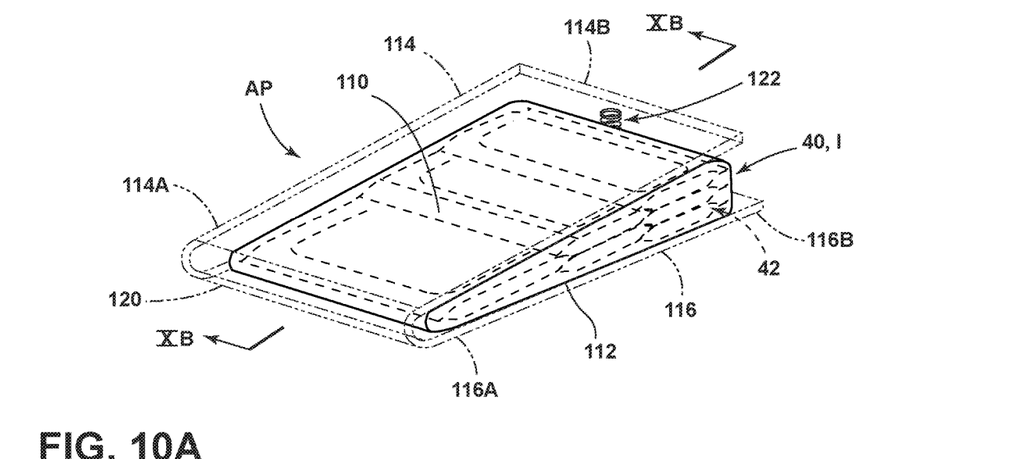
FIG. 10A is a top perspective view of an air bladder in an inflated condition disposed between upper and lower support substrates.

Referring now to FIG. 10A, the air bladder 40 described above is shown having an upper support surface 110 and a lower support surface 112. The air bladder 40 includes the plurality of cells 42, but is also contemplated to be a single air bladder for use as an actuator disposed between first and second support substrates 114, 116. The first support substrate 114 is shown in phantom to reveal that the first support substrate 114 is supported on the upper support surface 110 of the air bladder 40. The second support substrate 116 is shown supporting the air bladder 40 at lower support surface 112 thereof. The first and second support substrates 114, 116 are hingedly coupled to one another at a hinged connection 120 disposed at first ends 114A, 116A of the first and second support substrates 114, 116, respectively. The hinged connection 120 between the first and second support substrates 114, 116 can be a living hinge configuration, or a hinge assembly coupled therebetween that allows for second ends 114B, 116B of the first and second support substrates 114, 116, respectively, to move relative to one another as the air bladder 40 actuates during an inflation or deflation procedure. In FIG. 10A, the air bladder 40 is shown in an inflated condition I, wherein the second ends 114B, 116B of the support substrates 114, 116 are spaced-apart from one another to provide an angled first support substrate 114. From the inflated condition I, the air bladder 40 can be deflated (FIG. 10C) to a deflated condition D, thereby bringing the second ends 114B, 116B of the first and second support substrates 114, 116 into closer proximity in an at-rest position AR. Thus, the first and second support substrates 114, 116 are shown in an actuated position AP as the air bladder 40 has inflated to the inflated condition I to displace the first support substrate 114 relative to the second support substrate 116. Further, it is contemplated that the second support substrate 116 may be a stationary support substrate, such as the cushioned material CM (FIG. 3A) disposed in a vehicle seat.

Figure 10B:
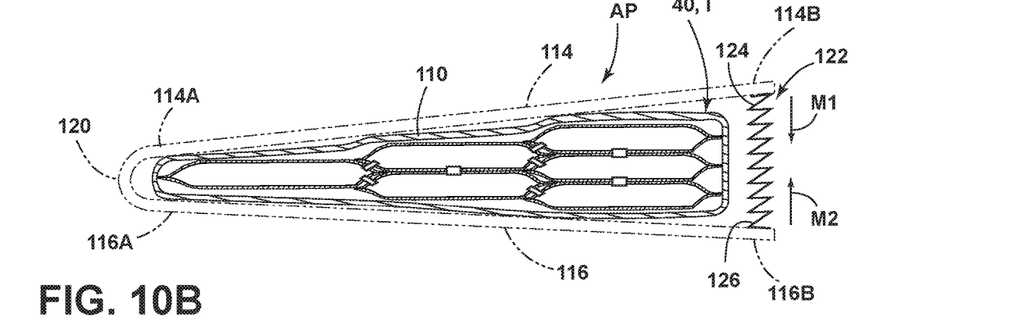
FIG. 10B is a cross-sectional view of the air bladder of FIG. 10A taken at line XB.
Figure 10C:
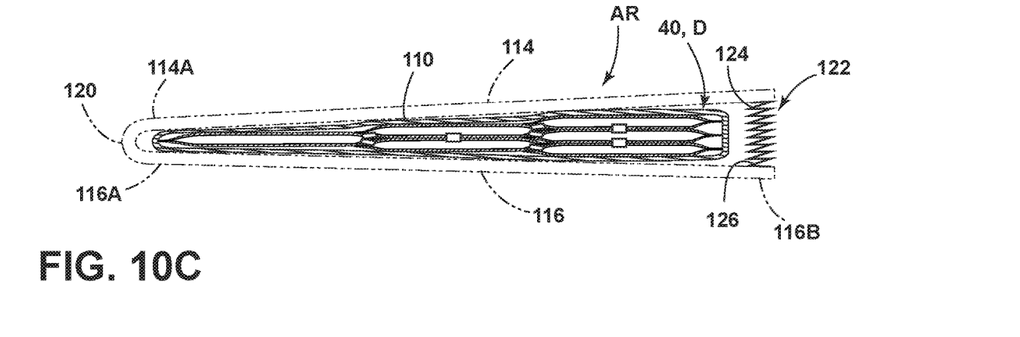
FIG. 10C is side elevational view of the air bladder of FIG. 10B with the air bladder in a deflated condition.

Referring now to FIG. 10B, the air bladder 40 is shown in an inflated condition I between the first and second support substrates 114, 116. The second ends 114B, 116B of the first and second support substrates 114, 116 are shown interconnected by a biasing mechanism 122. The biasing mechanism 122 shown in FIG. 10B is in the form of a coil spring having a first end 124 that is coupled to the first support substrate 114, and a second end 126 that is coupled to the second support substrate 116. Specifically, the biasing mechanism 122 is coupled to the first and second support substrates 114, 116 at the second ends 114B, 116B, respectively, thereof. In use, the biasing mechanism 122 is configured to urge the first support substrate 114 or the second support substrate 116, or both, towards the at-rest position AR shown in FIG. 10C. Arrows M1, M2 are shown in FIG. 10B to illustrate the retraction of the biasing mechanism 122 to bring the second ends 114B, 116B of the first and second support substrates 114, 116, respectively, towards one another as the air bladder 40 deflates from the inflated condition I to the deflated condition D shown in FIG. 10C. Thus, with specific reference to FIG. 10C, the air bladder 40 is shown in a deflated condition D, such that the first and second support substrates 114, 116 are shown close to one another in a substantially horizontal at-rest position AR as compared to the angled actuated position AP shown in FIGS. 10A and 10B. The biasing mechanism 122 is used to help move the first and second support substrates 114, 116, either separately or together, to the at-rest position AR as the air bladder 40 deflates from an inflated condition I shown in FIGS. 10A, 10B. In this way, the biasing mechanism 122 provides better control of the movement of the support substrates 114, 116 and ensures a consistent movement of the first and second support substrates 114, 116 during the deflation of the air bladder 40 disposed therebetween.

Figure 11A:
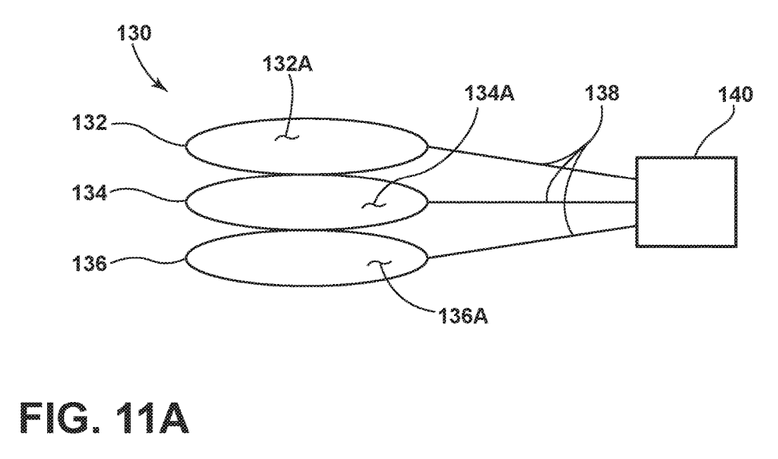
FIG. 11A is a diagram of a stacked air bladder configuration designed for simultaneous inflation.

Referring now to FIG. 11A, a stacked air bladder configuration 130 is shown having individual air bladders or cells 132, 134, 136. As shown in FIG. 11A, each air bladder 132-136 includes an interior volume 132A, 134A, 136A. The air bladders 132-136 are shown connected with a valve box 140 through supply lines 138. In the embodiment shown in FIG. 11A, the supply lines 138 individually connect the interior volumes 132A-136A with the valve box 140, such that the interior volumes 132A-136A of the air bladders 132-136 will inflate simultaneously with one another as supplied air from the valve box 140.

Figure 11B:
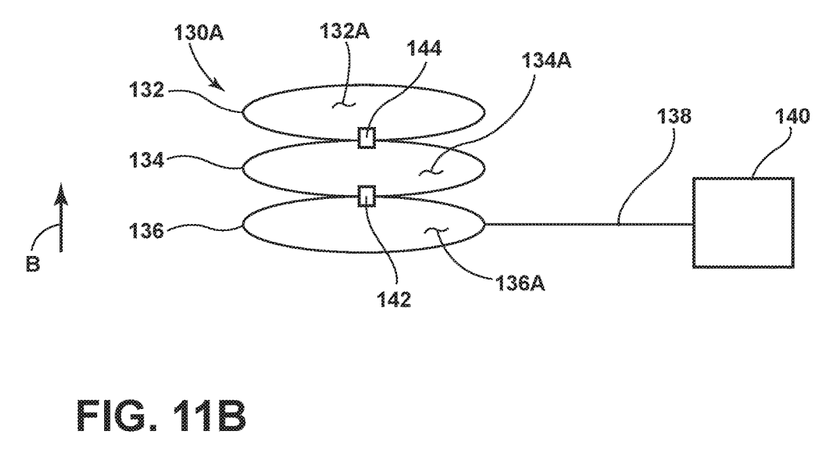
FIG. 11B is a diagram of a stacked air bladder configuration designed for directional inflation in series.

Referring now to FIG. 11B, a stacked configuration of air bladders 130A is shown wherein air bladders or cells 132-136 include interior volumes 132A-136A which are connected in series. Specifically, the stacked air bladder configuration 130A is connected to a valve box 140 via a single supply line 138 that interconnects with the interior volume 136A of air bladder 136. Interconnections 142, 144 are shown disposed between air bladder 136 and air bladder 134, as well as air bladder 134 and air bladder 132. Thus, in the configuration shown in FIG. 11B, the valve box 140 will supply air to the interior volume 136A of air bladder 136 via supply line 138 until the interior volume 136A reaches a pressure threshold necessary to open interconnection 142 into the interior volume 134A of the air bladder 134. As the interior volume 134A of air bladder 134 fills, an internal pressure threshold will exceed the pressure threshold defined by interconnection 144, such that interconnection 144 will open into the interior volume 132A of air bladder 132. In this way, the air bladders 132-136 of the stacked air bladder configuration 130A will fill in series from air bladder 136, to air bladder 134, to air bladder 132 using a single valve box 140 and a single supply line 138. This filling of the stacked air bladder configuration 130A in series provides for a directional inflation of the stacked air bladders 130A in an upward direction as indicated by arrow B.

Figure 12A:
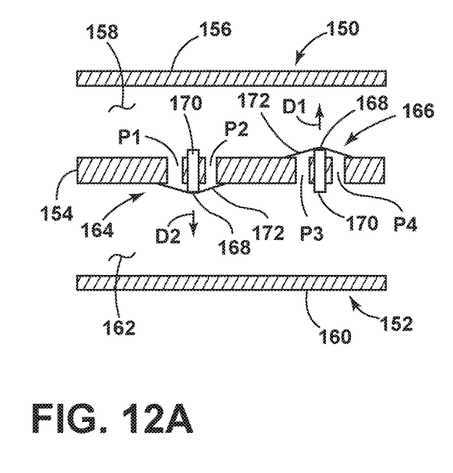
FIG. 12A is a fragmentary view of first and second cells of FIG. 5 taken at location XII having a shared membrane wall with exemplary closed interconnections disposed therebetween.

Referring now to FIG. 12A, an exemplary embodiment of an interconnection between adjacent air bladders is illustrated in a fragmented view. Specifically, in the embodiment of FIG. 12A, a portion of a first cell 150 is shown disposed above a portion of a second cell 152. The first and second cells 150, 152 are adjacent air bladders which have a shared membrane wall 154 disposed therebetween. The shared membrane wall 154 may be comprised of a top wall from cell 152 and a bottom wall of first cell 150, or may be a single shared membrane wall disposed therebetween. The first cell 150 further includes an outer membrane wall 156 and an interior volume 158. The second cell 152 also includes an outer membrane wall 160 and an interior volume 162. Disposed on the shared membrane wall 154 of the adjacent first and second cells 150, 15, first and second valve assemblies 164, 166 are disposed. Each valve assembly 164, 166 includes first and second ends 168, 170. The first ends 168 also include flap portions 172 used to close passage ways P1 through P4. Specifically, the first valve assembly 164 includes the flap portion 172 used to close passage ways P1, P2 which interconnects the interior volumes 158, 162 of the first cell 150 and second cell 152, respectively. Further, the second valve assembly 166 includes flap portion 172 which is used to close pathways P3, P4 interconnecting the interior volumes 158, 162 of the first and second cells 150, 152, respectively. The valve assemblies 164, 166 are directional valve assemblies configured to open to allow air to move in first and second directions D1, D2, respectively.

Figure 12B:
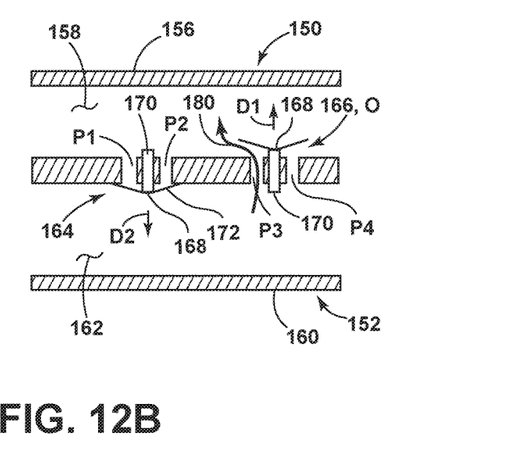
FIG. 12B is a fragmentary view of the first and second cells of FIG. 12A having a first interconnection disposed in an open condition.
Figure 12C:
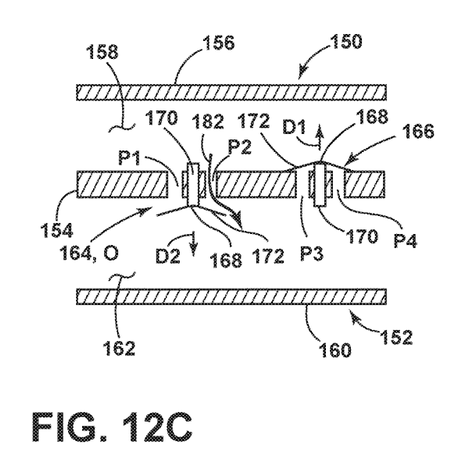
FIG. 12C is a fragmentary view of the first and second cells of FIG. 12A having a second interconnection disposed in an open condition.

Referring now to FIG. 12B, valve assembly 166 is shown in an open position O relative to the closed position shown in FIG. 12A. In this way, air is able to move through passage ways P3 and P4 in the direction as indicated by arrow 180. This is due to an internal pressure of the interior volume 162 of second cell 152 exceeding a threshold pressure of second valve assembly 166. When the threshold pressure defined by second valve assembly 166 is reached within the interior volume 162 of cell 152, the flaps 172 of second valve assembly 166 will open to allow air to move from the interior volume 162 of cell 152 to the interior volume 158 of first cell 150. Similarly, as shown in FIG. 12C, when the internal pressure of interior volume 158 of the first cell 150 reaches and exceeds a threshold pressure of the first valve assembly 164, the first valve assembly 164 will move to an open position O to allow air to pass from the first cell 150 into the second cell 152 along the path as indicated by arrow 182. In this way, the first and second valve assemblies 164, 166 are directional pressure valves that respond to the internal pressures of the interior volumes of the air bladders with which they are associated. In this way, adjacent air bladders, such as first and second cells 150, 152 can self-regulate the pressure therebetween using directional pressure valves, such as valve assemblies 164, 166, as interconnections between the first and second cells 150, 152.

Figure 12D:
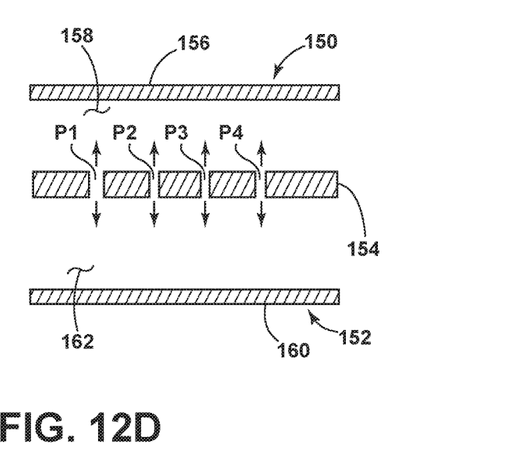
FIG. 12D is a fragmentary view of first and second cells having a shared membrane wall that is a permeable membrane wall.

Referring now to FIG. 12D, the first and second cells 150, 152 may also include a shared membrane wall 154 disposed therebetween that is a permeable membrane wall having passage ways P1, P2, P3 and P4 disposed therethrough. The permeable shared membrane wall 154 can be used to self-regulate air flow between the interior volumes 158, 162 of the cells 150, 152 to regulate pressure therebetween. It is contemplated that the permeability of the membrane wall 154 is dictated by the internal pressure of the interior volumes 158, 162 of the adjacent cells 150, 152.

Figure 12E:
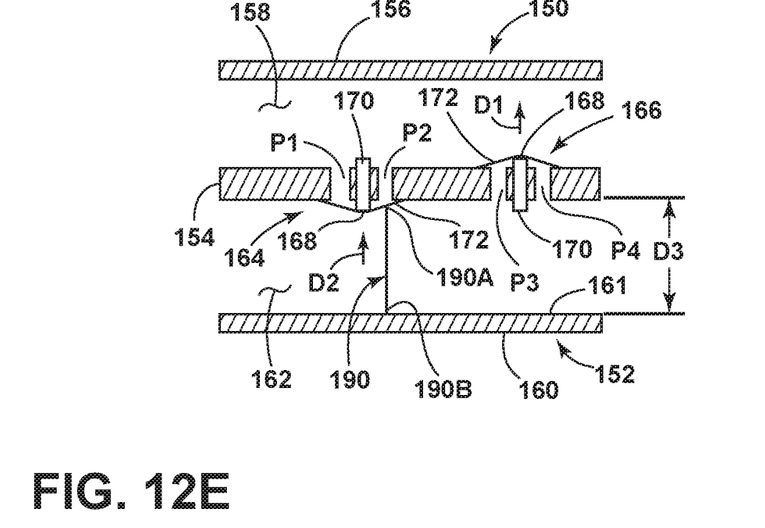
FIG. 12E is a fragmentary view of the first and second cells of FIG. 12A having a shared membrane wall with exemplary closed interconnections disposed therebetween.
Figure 12F:
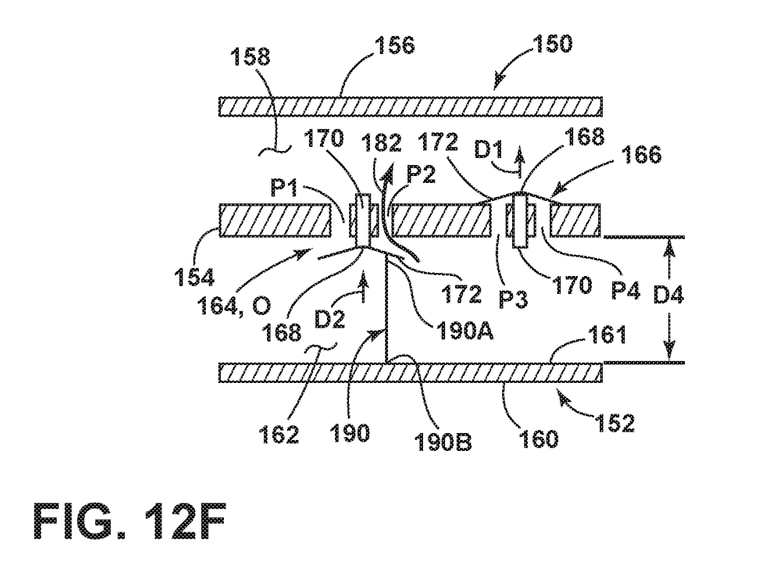
FIG. 12F is a fragmentary view of the first and second cells of FIG. 12E, with the second cell in an inflated condition and a tethered interconnection disposed in an open condition.

Referring now to FIG. 12E, the first and second cells 150, 152 are shown with the second cell 152 having the outer membrane wall 160 with an interior surface 161. A tether 190 extends inwardly into the interior volume 162 of second cell 152 and has a first end 190A attached to flap portion 172 of valve assembly 164, and a second end 190B attached to the interior surface 161 of the second cell 152. Thus, as the interior volume 162 of the second cell 152 fills with air, the shared membrane wall 154 will move from an initial distance D3 (FIG. 12E) from the outer membrane wall 160, to a second distance D4 (FIG. 12F) from the outer membrane wall 160. When the second cell 152 has inflated with air, the movement of the shared membrane wall 154 form the first distance D3 to the greater second distance D4 causes the tether 190 to pull the flap portion 172 of valve assembly 164 to an open position as shown in FIG. 12F, such that air can move from the interior volume 162 of the second cell 152 to the interior volume 158 of the first cell 150 along the path indicated by arrow 182. Thus, the valve assembly 164 is a directional valve as indicated by arrow D2 from the second cell 152 to the first cell 105. The opening and closing of valve assembly 164 is dictated by the stroke of the inflation of second cell 152. Thus, tethered valves, such as valve assembly 164 shown in FIGS. 12E and 12F, can be used with present concept to provide an alternative from of directional inflation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat, comprising:
    an air bladder having first and second support surfaces and a plurality of interconnected cells enclosed within a cavity defined by an outer casing of the air bladder;
    first and second support substrates supported respectively on the first and second support surfaces of the air bladder, wherein the first and second support substrates are hingedly connected to one another at first ends thereof and operable between at-rest and actuated positions as the air bladder inflates and deflates; and
    a biasing mechanism biasing the first and second support substrates towards the at-rest position, wherein the biasing mechanism interconnects the first and second support substrates at second ends thereof.

2. The seat of claim 1, wherein the biasing mechanism includes a spring member having first and second ends, wherein the first end of the spring member is coupled to the second end of the first support substrate, and further wherein the second end of the spring member is coupled to the second end of the second support substrate.

3. The seat of claim 1, wherein the plurality of interconnected cells includes individual cells which inflate in series to provide a directional inflation of the air bladder from a first end thereof, to a second end thereof.

4. The seat of claim 1, wherein the first support substrate moves to the actuated position as the air bladder inflates to an inflated condition, wherein the actuated position of the first support substrate is an angled position relative to a substantially horizontal position of the first support substrate in the at-rest position.

5. The seat of claim 4, wherein the biasing mechanism biases the first support substrate towards the substantially horizontal position from the angled position as the air bladder deflates to a deflated condition.

6. A seat, comprising:
    a seat portion;
    an air bladder disposed within the seat portion and a having a plurality of cells defining an intercellular structure arranged within a cavity of the air bladder to provide a directional inflation of the air bladder from a first portion of the air bladder to a second portion of the air bladder, wherein the cells of the plurality of cells are arranged within the air bladder on a plurality of interconnected sheets configured in a stack configuration, each sheet of the plurality of sheets having individual cells interconnected with one another within body portions of each sheet of the plurality of sheets; and
    one or more directional pressure valves interconnecting the plurality of cells within the air bladder.

7. The seat of claim 6, wherein the air bladder includes an outer casing defining parameters of the cavity and an outer contour defined by an outer surface of the outer casing.

8. The seat of claim 6, wherein the directional inflation of the air bladder from the first portion of the air bladder to the second portion of the air bladder includes an upward inflation direction.

9. The seat of claim 6, wherein the directional inflation of the air bladder from the first portion of the air bladder to the second portion of the air bladder includes an upward and outward inflation direction.

* * * * *